United States Patent [19]

Quemere

[11] Patent Number: 5,010,052
[45] Date of Patent: Apr. 23, 1991

[54] ZIRCONIUM DIOXIDE GAS DESULFURIZATION CATALYST

[75] Inventor: Eric Quemere, Cormeilles/en/Parisis, France

[73] Assignee: Rhone-Poulenc Chimie, Courbevoie, France

[21] Appl. No.: 368,087

[22] Filed: Jun. 19, 1989

Related U.S. Application Data

[63] Continuation of Ser. No. 44,337, Apr. 30, 1987, abandoned.

[30] Foreign Application Priority Data

Apr. 30, 1986 [FR] France ............................ 86 06261

[51] Int. Cl.$^5$ ........................ B01J 21/06; B01J 23/10
[52] U.S. Cl. ................................. 502/304; 423/244
[58] Field of Search ............... 502/242, 304, 349, 350; 423/244 R

[56] References Cited

U.S. PATENT DOCUMENTS

| 2,206,921 | 7/1940 | Schulze | 502/349 X |
| 2,338,089 | 1/1944 | Bond | 502/349 X |
| 2,436,125 | 2/1948 | Spence et al. | 502/242 X |
| 4,233,139 | 11/1980 | Murrell et al. | 502/349 X |
| 4,295,818 | 10/1981 | Angwin et al. | 502/349 X |
| 4,640,908 | 2/1987 | Dupin | 502/304 X |
| 4,656,155 | 4/1987 | Josefowicz | 502/304 X |

FOREIGN PATENT DOCUMENTS 58-114730 7/1983 Japan .................................. 502/304

OTHER PUBLICATIONS

Lowell et al., "Selection of Metal Oxides for Removing $SO_2$ from Flue Gas", Ind.l Eng. Chem. Process Des. Develop., vol. 10, No. 3, pp. 384–390(1971).

Primary Examiner—W. J. Shine
Attorney, Agent, or Firm—Burns, Doane, Swecker & Mathis

[57] ABSTRACT

Solid catalyst substrates based on zirconium dioxide and, optionally, titanium dioxide and/or cerium dioxide, e.g., honeycombs or monoliths, are well adapted for the desulfurization and catalytic conversion of industrial gases containing contaminating amounts of objectionable sulfur compounds.

6 Claims, No Drawings

ZIRCONIUM DIOXIDE GAS DESULFURIZATION CATALYST

This application is a continuation of application Ser. No. 07/044,337, filed Apr. 30, 1987.

BACKGROUND OF THE INVENTION

1. Field of the Invention

The present invention relates to a novel catalyst for the treatment/purification of industrial gases containing contaminating amounts of sulfur compounds.

As utilized herein, by the term "treatment of sulfur compounds" is intended any catalytic conversion of sulfur compounds contained in residual industrial gases into readily removable compounds.

This invention especially relates to a novel catalyst based on zirconium dioxide and use thereof in the Claus catalysis for the recovery of sulfur from residual gases comprising, in particular, hydrogen sulfide, sulfur dioxide and possibly organic sulfur derivatives, such as $CS_2$ and COS.

2. Description of the Prior Art

In the conventional Claus process (to which the present invention is not limited), the recovery of sulfur from a gas containing hydrogen sulfide and possibly organic sulfur derivatives, includes two stages:

In a first stage, the hydrogen sulfide is burned in the presence of a controlled amount of air to convert a portion of the gas into sulfur dioxide, and in a second stage, the gaseous mixture thus produced is charged into reactors connected in series and containing a catalyst, in which the following reaction takes place:

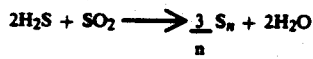

In addition to hydrogen sulfide, the Claus gases may contain carbon compounds of sulfur, such as COS and $CS_2$, which are generally relatively stable and resistant to catalytic conversion, and which contribute to an increase of 20 to 50% in the emission of $SO_2$ and sulfur compounds into the atmosphere, following incineration of the fumes. These problematical compounds are either already contained in the gas to be treated, or are formed at high temperatures during the first stage.

These compounds may be eliminated by several types of reactions, in particular by hydrolysis according to the reactions (2), (3) and/or (4):

  (2)

  (3)

  (4)

It has long been known to this art that alumina can be used as a catalyst for such types of reaction. However, alumina is only moderately effective for the elimination of those organic sulfur compounds noted above.

More recently, titanium dioxide has been used as a catalyst for such purpose: it displays catalytic activity clearly superior to that of alumina for the elimination of organic sulfur compounds. However, $TiO_2$ has a mediocre initial activity at short contact times.

SUMMARY OF THE INVENTION

Accordingly, a major object of the present invention is the provision of an improved catalyst for the treatment/purification of industrial gases containing contaminating amounts of objectionable sulfur compounds, such improved catalyst having a particularly high initial activity over short contact times and a particularly high activity in the aforenoted reactions for the removal of organic sulfur compounds from said impure industrial gases.

Consistent herewith, it has now been discovered that formulations based on zirconium dioxide exhibit those desiderata outlined above.

Briefly, the catalysts according to the invention for the treatment/purification of residual industrial gases contamined with sulfur compounds may be in any one of a number of different forms.

In a first embodiment, the catalyst is a solid product comprised of zirconium dioxide.

In a variant of such first embodiment, the catalyst also comprises titanium dioxide and/or cerium dioxide.

In a second embodiment of the invention, the catalyst comprises a support containing zirconium dioxide and a supported phase containing titanium dioxide.

In a third embodiment, the catalyst comprises a support containing titanium dioxide and a supported phase containing zirconium dioxide.

DETAILED DESCRIPTION OF THE PREFERRED EMBODIMENTS OF THE INVENTION

More particularly according to the present invention, the essential characteristic of the subject catalyst is that zirconium dioxide constitutes the active phase thereof.

It may be prepared by any known means, for example by precipitation. In this case, such precipitation may be carried out by the addition of a basic compound, for example ammonia, to an acidic precursor of zirconium, for example a nitrate, chloride or sulfate of zirconium. This mode of preparation may also be carried out by reversing the order of addition of the reagents.

Other techniques for the preparation of the zirconium dioxide include calcination, in particular the direct calcination of a precursor of the above-mentioned type, for example in a flame medium.

The sol processes are also applicable, in particular, those entailing charging a precursor of above type through a sol obtained by hydrolysis at elevated temperatures.

Furthermore, the oxide may be present in the catalysts of the invention either alone or in admixture with other elements and in particular catalytically active elements. Thus, the amount of the zirconium dioxide may range from 0.5% to 100% by weight relative to the final product catalyst.

Exemplary of such other catalytically active elements, titanium dioxide is especially representative. Formulations based on titanium dioxide and zirconium dioxide have a particularly high initial activity over short contact times.

In these formulations, the respective amounts of titanium dioxide and zirconium dioxide may vary over wide limits. By way of example, industrial formulations containing from 5 to 75% and more particularly 5 to 30% by weight of zirconium dioxide, are illustrative.

Cerium dioxide may also be used as the other catalytically active element. The amounts of zirconium dioxide and cerium dioxide may also vary over wide proportions, in particular the same range illustrated in the case of titanium dioxide.

In another embodiment of the invention, a formulation is used based on zirconium dioxide, cerium dioxide, and titanium dioxide.

The catalysts according to the invention may also contain, in addition to the zirconium dioxide, one or more additives, including at least one the oxides of elements selected from among silicon, aluminum, yttrium and the rare earths.

These additives are useful for stabilizing the specific surface of zirconium dioxide at elevated temperatures. Compare, for example, published French Application No. 85/17764, assigned to the assignee hereof.

These additives for the stabilization of the specific surface are use in amounts typically varying from about 1 to about 10% by weight of the oxide, relative to the total amount of zirconium dioxide and additive, preferably from 2 to 5%.

During the preparation of the catalyst, such additives are generally introduced in the form of their precursors. Thus, exemplary of precursors of aluminum oxide, the nitrates and sulfates are representative.

As the precursors of silicon dioxide, the quaternary ammonium silicates are preferably used.

Exemplary of the precursors of the rare earths and yttrium, representative are the nitrates, chlorides, sulfates and carbonates of the lanthanides, such as yttrium, lanthanum, cerium, praseodymium, neodymium, samarium, europium, gadolinium, therbium, disprosium, holmium, erbium, thulium, ytterbium, lutecium. Among these elements, yttrium, lanthanum and cerium are the preferred.

Furthermore, as a function of the form into which the subject catalysts are sought to be formulated, it is possible to incorporate certain formulation-forming additives. These additives are used conventionally in the various forming processes. They produce various pastes, by mixing, having rheological properties suitable for forming. Exemplary of such forming additives, the following are representative: cellulose, carboxymethyl cellulose, carboxyethyl cellulose, tail oil, xanthan gums, surface active agents, flocculating agents, such as polyacrylamides, carbon black, starches, stearic acid, polyacrylic alcohol, polyvinyl alcohol, biopolymers, glucose, polyethylene glycol, and the like.

Finally, the amount of these additives typically ranges from 0.1 to 15% by weight with respect to the finished catalyst.

It is also envisaged to incorporate supplemental components capable of improving the mechanical properties of the formulations. These components may be selected from among the clays, alkaline earth silicates and sulfates and ceramic fibers. These components are advantageously used in amounts by weight relative to the finished catalyst of up to 99.5%, preferably up to 60% and more preferably up to 30%.

The catalysts according to the invention may be prepared by known process for providing a solid final product, or a product comprising a supported active phase.

The solid products may thus be produced by forming a mixture of the various components of the catalyst.

A representative mixture which is suitable for such purpose is based on water, a powder containing zirconium dioxide or hydrated zirconium dioxide, and the other additives of the aforementioned types as the case may be, optionally together with the forming agents and the oxides or hydrated oxides of other catalytically active elements.

By "hydrates oxides" are intended compounds of the formula $MO_x(OH)_y \cdot zH_2O$, with M being Zr, Ti or Ce.

The mixture obtained in this matter is then formed. The forming process may provide products of different shapes, for example, spherical, cylindrical, solid or hollow extrusions or extrudates, in particular having a cylindrical, tri-lobed, quadri-lobed or multi-lobed profile. Final products can also be produced in the form of tablets, pellets, granules, monoliths and, more particularly, in the form of a honeycomb, etc., having different dimensions. They may in particular be produced by means of a tabletting machine, a rotating granulator, an extrusion molding machine, a machine to form pellets, or a combination of an extrusion molding machine with a rotating granulator.

In a particularly advantageous embodiment, the final catalysts are solid or hollow extruded materials having a cylindrical, multi-lobed (such as, for example, tri- or quadri-lobed profile) and honeycomb configuration.

In a last stage, the products produced in this manner are optionally dried, then calcined.

Solid products based on zirconium dioxide alone, on zirconium dioxide and additives for stabilizing the specific surface thereof, or mixed or ternary products based on zirconium dioxide, titanium dioxide and cerium dioxide, optionally in combination with the above additives, are conveniently produced by this process.

Another mode of production can be used to prepare supported catalysts, in particular for catalysts comprising a support of titanium dioxide with zirconium dioxide as the supported phase, or, conversely, comprising a support based on zirconium dioxide and with titanium dioxide as the supported phase. It will be appreciated that in each of these cases the catalyst may also contain cerium dioxide.

The support may be prepared and shaped from a mixture of a powder of the dioxide or hydrated dioxide of zirconium or titanium, and optionally including the forming additives, as described above.

The support produced in this manner may subsequently be impregnated or coated to effect deposition of the supported phase. The impregnation or coating process may be carried out in any known manner by contacting the support with a solution, a sol, or a gel comprising the aforenoted oxides or precursors of such oxides, and which are destined to constitute the supported active phase.

In a variation of the production scheme, a support (in particular, of titanium dioxide) is first coated with zirconium dioxide or a precursor of such oxide, with the coating possibly preceded or followed by impregnation with zirconium oxide or precursor thereof.

It is thus possible to impregnate a zirconium dioxide support with a solution of a precursor of titanium dioxide or a precursor of the aforesaid additives.

Finally, it is also possible to prepare the catalysts of the invention by coprecipitation or cogelification of the component elements.

It too is envisaged to use the subject catalytic formulations described above on monoliths. In such a case, the support may be metal or ceramic monoliths. They are particularly one or more refractory oxides, preferably in the form of a film or a coating applied to a monolith of the above type, said monolith preferably being in the form of a rigid structure having a honeycomb configuration and comprising a plurality of channels or conduits therethrough. Such supports are well known to this art and have been widely described in the literature.

Exemplary of the preferred refractory oxides, representative are magnesium, calcium, strontium, barium, scandium, lanthanide, indium, thallium, silicon, titanium, hafnium, thorium, germanium, lead, vanadium, niobium, tantalum, chromium, molybdenum, tungsten and rhenium oxides.

The metal monoliths are advantageously those produced from alloys of chromium, aluminum and cobalt, such as those marketed under the trademark KANTHAL, or those produced from alloys of iron, chromium, aluminum and yttrium, marketed under the trademark of FECRALLOY. The metal may also be carbon steel or simple cast iron.

The ceramic monoliths are advantageously those comprising, as their principal material: cordierite, alumina, mullite, zirconium, zirconmullite, barium titanate, porcelain, thorium oxide, magnesium oxide, steatite, boron or silicon carbonates.

The cellular structure of the honeycombs may be in the hexagonal, tetragonal, triangular or undulating form; it must permit the passage of gas within the channels or conduits formed during the manufacture thereof, whether by extrusion, rolling, solidification of the elements in sheet form, or the like.

This invention also features the use of the catalysts described above in the treatment/purification of industrial gases containing contaminating amounts of sulfur compounds and in particular by CLAUS catalytis (described above).

In order to further illustrate the present invention and the advantages thereof, the following specific examples are given, it being understood that same are intended only as illustrative and in nowise limitative.

COMPARATIVE EXAMPLE 1

Catalyst 1

This example illustrates the preparation of an alumina-based catalyst according to the prior art. The catalyst was produced by the rapid dehydration of BAYER process hydrate at 800° C. The flashed product was ground and then agglomerated in a pelleting machine. The resulting spheroidal particulates were aged at 100° C. for 12 hours, then calcined at 500° C. for 4 hours. The product catalyst had the following properties:

| (i)   | Sphere diameter        | 4 mm                        |
|-------|------------------------|-----------------------------|
| (ii)  | SBE (specific surface) | 250 m$^2$g$^{-1}$           |
| (iii) | VPT (total pore volume)| 0.48 cm$^3$g$^{-1}$         |

COMPARATIVE EXAMPLE 2

Catalyst 2

This example illustrates the preparation of a titanium dioxide-based catalyst according to the prior art. To a suspension of titanium dioxide obtained after hydrolysis and filtration, in the conventional process of decomposition of ilmenite with sulfuric acid, a suspension of lime was added to neutralize all sulfate values. The suspension was dried at 150° C. for 1 hour. The resulting powder was kneaded for 2 hours in the presence of water and nitric acid, in the following proportions:

| (i)  | TiO$_2$ powder | 50% |
|------|----------------|-----|
| (ii) | HNO$_3$        | 2%  |

| (iii) | H$_2$O | 40% |
|-------|--------|-----|

The mixture was then extruded through a 3.2 mm die orifice. The extrusions were dried at 120° C. for 15 hours, then calcined at 450° C. for 2 hours.

The properties of the catalyst thus produced were as follows:

| (i)   | Extrudate diameter: | 3 mm                |
|-------|---------------------|---------------------|
| (ii)  | SBE                 | 120 m$^2$g$^{-1}$   |
| (iii) | VPT                 | 0.35 cm$^3$g$^{-1}$ |

COMPARATIVE EXAMPLE 3

Catalyst 3

This example illustrates the preparation of a catalyst according to the prior art based on titanium dioxide deposited onto a silica support.

The catalyst was prepared by adding TiCl$_4$ (38.85 g) dropwise to 150 ml of water at a temperature of 10° C. 146 ml of the resulting solution was used to impregnate 128.4 g of silica spheres. The impregnated spheres were then dried for 2 hours at 120° C., the temperature of the dried spheres being increased to 500° C. at a rate of 100° C./h. The temperature was maintained at 50° C. for two hours and then the spheres were permitted to cool to ambient temperature.

The catalyst thus produced had the following properties:

| (i)   | Atomic Ti/Si ratio | 0.10                |
|-------|--------------------|---------------------|
| (ii)  | SBE                | 280 m$^2$g$^{-1}$   |
| (iii) | VPT                | 0.82 cm$^3$g$^{-1}$ |

COMPARATIVE EXAMPLE 4

Catalyst 4

This example illustrates the preparation of a catalyst according to the prior art, based on zirconium dioxide deposited onto a silica support. 90.7 g of silica spheres of the same type as in Example 3 were impregnated with 92.5 ml of an aqueous solution of zirconium nitrate, containing 20.8 g of this salt. The spheres were then treated as in Example 3.

The catalyst thus produced had the following properties:

| (i)   | Atomic Zr/Si ratio | 0.05                |
|-------|--------------------|---------------------|
| (ii)  | SBE                | 250 m$^2$/g         |
| (iii) | VPT                | 0.74 cm$^3$g$^{-1}$ |

EXAMPLE 5

Catalyst 5

This example illustrates the preparation of a solid catalyst according to the invention, based on titanium dioxide and zirconium dioxide. To a suspension of titanium dioxide obtained after hydrolysis and filtration, in a conventional process of the sulfuric acid decomposition of ilmenite, a suspension of lime was added, to neutralize the entirety of the sulfate values. The suspension was dried at 150° C. for 1 hour.

The resulting powder was kneaded for 2 hours in the presence of water and nitric acid, together with a powder of hydrated zirconium dioxide, prepared by treating basic zirconium sulfate with sodium hydroxide, and then washing same with nitric acid and water, in the following proportions:

| (i) | Hydrated titanium dioxide | 56% |
|---|---|---|
| (ii) | Hydrated zirconium dioxide | 18% |
| (iii) | $HNO_3$ | 3% |
| (iv) | $H_2O$ | 23% |

The mixture was then extruded through a die orifice having a diameter of 3.2 mm. The extrusions were dried at 120° C. for 15 hours, then calcined at 450° C. for 2 hours.

The properties of the catalyst thus produced were as follows:

| (i) | Extrudate diameter | 3 mm |
|---|---|---|
| (ii) | SBE | 119 $m^2g^{-1}$ |
| (iii) | VPT | 0.29 $cm^3g^{-1}$ |
| | Composition by weight: | |
| | $TiO_2 = 75\%$ | |
| | $ZrO_2 = 25\%$ | |

EXAMPLE 6

Catalyst 6

This example illustrates the preparation of a solid catalyst according to the invention, based on zirconium oxide. The powder of hydrated zirconium dioxide produced in Example 3 was kneaded for 1 hour in the presence of water and nitric acid, in the following proportions:

| (i) | Powder | 75% |
|---|---|---|
| (ii) | $HNO_3$ | 10% |
| (iii) | $H_2O$ | 15% |

The extrusions were dried at 120° C. for 15 hours, then calcined at 400° C. for 3 hours. The catalyst thus produced had the following characteristics:

| (i) | Extrudate diameter | 3 mm |
|---|---|---|
| (ii) | SBE | 90 $m^2g^{-1}$ |
| (iii) | VPT | 0.33 $cm^3g^{-1}$ |

EXAMPLE 7

Catalyst 7

This example illustrates the preparation of a solid catalyst according to the invention, based on zirconium dioxide and cerium dioxide.

A solution of cerous nitrate, with 800 g/l cerium, was calcined at 150° C. for 24 hours. The resulting cake was kneaded in the presence of water and nitric acid, together with a powder of hydrated zirconium dioxide, produced by treating basic zirconium sulfate with sodium hydroxide and then washing same with nitric acid and water, in the following proportions by weight.

| (i) | Hydrated cerium dioxide | 16% |
|---|---|---|
| (ii) | Hydrated zirconium dioxide | 53% |
| (iii) | $HNO_3$ | 8% |
| (iv) | $H_2O$ | 23% |

The resulting mixture was then extruded through a die orifice having a diameter of 3.2 mm. The extrusions were dried at 120° C. for 15 hours, then calcined at 450° C. for 2 hours.

The properties of the catalyst thus produced were as follows:

| (i) | Extrudate diameter | 3 mm |
|---|---|---|
| (ii) | SBE | 98 $M^2G$ |
| (iii) | VPT | 0.28 $cm^3g^{-1}$ |

EXAMPLE 8

Catalyst 8

This example illustrates the preparation of a solid catalyst according to the invention, based on zirconium dioxide, cerium dioxide and titanium dioxide. To a suspension of titanium oxide obtained after hydrolysis and filtration, in the conventional process of the sulfuric acid decomposition of ilmenite, a suspension of lime was added to neutralize the entirety of the sulfate values. The suspension was dried at 150° C. for 1 hour. The resulting powder was kneading for 2 hours in the presence of water and nitric acid, on the one hand together with a hydrated zirconium dioxide powder produced by treating basic zirconium sulfate with sodium hydroxide and then washing same with nitric acid and water, and, on the other hand, together with a powder of hydrated cerium dioxide prepared as in Example 7, in the following proportions by weight:

| (i) | Hydrated titanium dioxide | 43% |
|---|---|---|
| (ii) | Hydrated zirconium dioxide | 16% |
| (iii) | Hydrated cerium dioxide | 10% |
| (iv) | $HNO_3$ | 8% |
| (v) | $H_2O$ | 23% |

The mixture was then extruded through a die orifice having a diameter of 3.2 mm. The extrusions were dried at 120° C. for 15 hours, then calcined at 450° C. for 2 hours.

The properties of the catalyst thus produced were as follows:

| (i) | Extrudate | 3 mm |
|---|---|---|
| (ii) | SBE | 112 $m^2g^{-1}$ |
| (iii) | VPT | 0.29 $cm^3g^{-1}$ |

EXAMPLE 9

Test of Catalytic Activity

This example illustrates catalyst testing to compare the activities, in CLAUS conversions and in the elimination of $CS_2$, of different catalysts under the following conditions:

| (i) | Composition of the gas, by volume: | |
|---|---|---|
| | $H_2S$ | 6% |
| | $SO_2$ | 4% |
| | $CS_2$ | 1% |

-continued

|     |                              |          |
| --- | ---------------------------- | -------- |
|     | COS 0.5%                     |          |
|     | H$_2$O 30%                   |          |
|     | N 58.5%                      |          |
| (ii) | VVH = 900 h$^{-1}$          |          |
| (iii) | Inlet temperature of the reactor: | 225° C. |
| (iv) | Outlet temperature of the reactor: | 340° C. |

The outlet gases were analyzed by gaseous phase chromatography.

The results obtained are reported in Tables I and II below, before and in certain cases after aging for 15 hours of operation, 5 hours of which under 5000 VPM oxygen, respectively, in CLAUS catalysis and the elimination of CS$_2$. The numbers given indicate the degree of conversion in %.

TABLE I

Catalytic Results In CLAUS Conversion At Different Contact Times For Catalysts 1 To 8:

| Catalyst | Contact time | 0.5 s | 1 s | 2 s |
| --- | --- | --- | --- | --- |
| Comparative | | | | |
| Alumina | Catalyst 1 | 56 | 63 | 64 |
|  | Catalyst 1 after aging | 56 | 60 | 61 |
| TiO$_2$ | Catalyst 2 | 60 | 62 | 62 |
|  | Catalyst 2 after aging | 58 | 60 | 62 |
| TiO$_2$ SiO$_2$ support | Catalyst 3 | — | 61 | 64 |
| ZrO$_2$ SiO$_2$ support | Catalyst 4 | — | 60 | 63 |
| According to Invention | | | | |
| TiO$_2$—ZrO$_2$ | Catalyst 5 | 65 | 65 | 65 |
|  | Catalyst 5 after aging | 65 | 65 | 65 |
| ZrO$_2$ | Catalyst 6 | 62 | 64 | 64 |
|  | Catalyst 6 after aging | 58 | 64 | 64 |
| ZrO$_2$—CeO$_2$ | Catalyst 7 | 63 | 65 | 65 |
|  | Catalyst 7 after aging | 60 | 65 | 65 |
| ZrO$_2$—CeO$_2$— TiO$_2$ | Catalyst 8 | 63 | 65 | 65 |
|  | Catalyst 8 after aging | 60 | 65 | 65 |

TABLE II

Catalytic Results For the Elimination Of CS$_2$ At Different Contact Times for Catalysts 1 to 8:

| Catalyst | Contact time | 0.5 s | 1 s | 2 s |
| --- | --- | --- | --- | --- |
| Comparative | | | | |
| Al$_2$O$_3$ | Catalyst 1 | 30 | 55 | 87 |
|  | Catalyst 1 after aging | 7 | 17 | 62 |
| TiO$_2$ | Catalyst 2 | 30 | 70 | 92 |
|  | Catalyst 2 after aging | 30 | 55 | 87 |
| TiO$_2$ | Catalyst 3 | — | 29 | 53 |
| SiO$_2$ support ZrO$_2$ | Catalyst 4 | — | 23 | 42 |
| SiO$_2$ support According to Invention | | | | |
| TiO$_2$—ZrO$_2$ | Catalyst 5 | 68 | 97 | 100 |
|  | Catalyst 5 after aging | 70 | 96 | 100 |
| ZrO$_2$ | Catalyst 6 | 90 | 99 | 100 |
|  | Catalyst 6 after aging | 75 | 97 | 100 |
| ZrO$_2$—CeO$_2$ | Catalyst 7 | 91 | 95 | 98 |
|  | Catalyst 7 after aging | 76 | 90 | 94 |
| ZrO$_2$—CeO$_2$— TiO$_2$ | Catalyst 8 | 63 | 95 | 100 |
|  | Catalyst 8 after aging | 61 | 92 | 100 |

Examination of the results reported in Table I and Table II clearly evidences the superiority of the catalysts of the invention over the catalysts of the prior art.

Particularly noteworthy is the high activity for short contact times of the catalysts of the invention for the elimination/hydrolysis of CS$_2$. Results identical to those obtained for the elimination of CS$_2$ are also obtained for the elimination of COS.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A catalyst adapted for the desulfurization of gases in a Claus process, comprising a solid shaped article including catalytically effective amounts of zirconium dioxide and cerium dioxide, a catalyst support including zirconium dioxide and a support phase including titanium dioxide.

2. A catalyst as defined by claim 1, further including a catalytically effective amount of titanium dioxide.

3. The catalyst as defined by claimed 1, comprising a honeycomb shaped article.

4. A catalyst adapted for the desulfurization of gases in a Claus process, comprising a solid shaped article including catalytically effective amounts of zirconium dioxide and cerium oxide, a catalyst support including titanium dioxide and a support phase including zirconium dioxide.

5. A catalyst as defined by claim 4, further including a catalytically effective amount of titanium dioxide.

6. The catalyst as defined by claim 4, comprising a honeycomb shaped article.

* * * * *

UNITED STATES PATENT AND TRADEMARK OFFICE
CERTIFICATE OF CORRECTION

PATENT NO. : 5,010,052

DATED : April 23, 1991

INVENTOR(S) : Eric QUEMERE

It is certified that error appears in the above-identified patent and that said Letters Patent is hereby corrected as shown below:

Column 10:

Claim 1, line 5 thereof, "support" should read --supported--;

Claim 4, line 5 thereof, "support" should read --supported--.

Signed and Sealed this

Twenty-seventh Day of October, 1992

*Attest:*

DOUGLAS B. COMER

*Attesting Officer*      *Acting Commissioner of Patents and Trademarks*